United States Patent
Holman et al.

(10) Patent No.: US 11,488,135 B2
(45) Date of Patent: *Nov. 1, 2022

(54) SYSTEM AND METHOD FOR USING USER RATING IN REAL-WORLD DATA OBSERVATION CAMPAIGN

(71) Applicant: Observa, Inc., Seattle, WA (US)

(72) Inventors: Hugh Howard Holman, Seattle, WA (US); Erik Eugene Chelstad, Seattle, WA (US)

(73) Assignee: Observa, Inc., Seattle, WA (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/821,216

(22) Filed: Nov. 22, 2017

(65) Prior Publication Data

US 2018/0197166 A1  Jul. 12, 2018

Related U.S. Application Data (60) Provisional application No. 62/426,025, filed on Nov. 23, 2016.

(51) Int. Cl.
*G06Q 40/00* (2012.01)
*G06Q 20/22* (2012.01)
*G06Q 30/02* (2012.01)

(52) U.S. Cl.
CPC ......... *G06Q 20/22* (2013.01); *G06Q 30/0282* (2013.01)

(58) Field of Classification Search
CPC ............................ G06Q 30/0282; G06Q 20/22
USPC ..................................................... 705/35–40
See application file for complete search history.

(56) References Cited

U.S. PATENT DOCUMENTS

| | | | |
|---|---|---|---|
| 6,026,387 A | 2/2000 | Kesel | |
| 6,633,851 B1 | 10/2003 | Engler et al. | |
| 8,064,896 B2 | 11/2011 | Bell et al. | |
| 8,666,807 B1 * | 3/2014 | Murray | G06Q 30/0241 705/37 |
| 9,361,353 B1 * | 6/2016 | Aristides | G06F 16/735 |
| 9,508,082 B1 | 11/2016 | Mannix et al. | |
| 9,839,380 B2 * | 12/2017 | Short | G16H 20/00 |
| 2003/0009373 A1 | 1/2003 | Ensing et al. | |
| 2004/0034684 A1 | 2/2004 | Payne | |
| 2004/0220975 A1 | 11/2004 | Carpentier et al. | |

(Continued)

FOREIGN PATENT DOCUMENTS

WO    WO-0176120 A2 * 10/2001  ............. G01S 19/48

OTHER PUBLICATIONS

Spaan et al: "Decision-theoretic planning under uncertainty with information rewards for active cooperative perception", Delft University of Technology, Delft, The Netherlands, Dec. 23, 2014 (Year: 2014).*
ISR/WO dated Jan. 30, 2018 for PCT/US17/062829; filed Nov. 21, 2017.
Grocery & Retail News. "Get Paid for Snooping on Your Supermarket," <URL: http://couponsinthenews.com/2016/05/16/get-paid-for-snooping-on-your-supermarket/>.
ISR/WO dated Mar. 8, 2018; for PCT/US17/062816, filed Nov. 21, 2017.

(Continued)

*Primary Examiner* — Edward J Baird
(74) *Attorney, Agent, or Firm* — FisherBroyles LLP; Kevin D. Jablonski (57) ABSTRACT

Systems, apparatuses, processes, methods, and operations for enabling an observation campaign to be defined and executed. As part of that design and execution, a user's or prospective user's rating may be accessed and used to decide whether to make a specific opportunity or set of opportunities available to a specific user, and/or to process the data received from a certain user in a certain way.

11 Claims, 6 Drawing Sheets

(56) References Cited

U.S. PATENT DOCUMENTS

| | | |
|---|---|---|
| 2005/0149382 A1 | 7/2005 | Fenner et al. |
| 2006/0167971 A1 | 7/2006 | Breiner |
| 2008/0040216 A1 | 2/2008 | Dellovo |
| 2008/0183552 A1 | 7/2008 | O'Hagan |
| 2009/0063306 A1 | 3/2009 | Fano et al. |
| 2009/0204471 A1 | 8/2009 | Elenbaas et al. |
| 2009/0240516 A1* | 9/2009 | Palestrant .......... G06Q 30/0281 705/346 |
| 2010/0171826 A1 | 7/2010 | Hamilton et al. |
| 2010/0218108 A1* | 8/2010 | Crabtree ................ G06Q 50/06 715/738 |
| 2011/0029365 A1* | 2/2011 | Alhadeff ............ G06Q 30/0222 705/14.23 |
| 2011/0212717 A1 | 9/2011 | Rhoads et al. |
| 2012/0029978 A1 | 2/2012 | Olding et al. |
| 2012/0047008 A1* | 2/2012 | Alhadeff ............ G06Q 30/0214 705/14.16 |
| 2012/0265574 A1 | 10/2012 | Olding et al. |
| 2013/0018957 A1 | 1/2013 | Parnaby et al. |
| 2013/0079128 A1 | 3/2013 | Thomas et al. |
| 2013/0132170 A1 | 5/2013 | Yelisetti et al. |
| 2013/0132987 A1 | 5/2013 | Narasimhan et al. |
| 2013/0203433 A1 | 8/2013 | Luna et al. |
| 2013/0204652 A1 | 8/2013 | Marins et al. |
| 2013/0282446 A1 | 10/2013 | Dobell |
| 2014/0074591 A1* | 3/2014 | Allen ................ G06Q 30/0244 705/14.43 |
| 2014/0173285 A1 | 6/2014 | Manchala |
| 2014/0180772 A1 | 6/2014 | Tutupata et al. |
| 2014/0249889 A1 | 9/2014 | Park et al. |
| 2014/0278850 A1 | 9/2014 | Boccuzzi, Jr. et al. |
| 2014/0324555 A1 | 10/2014 | Wu et al. |
| 2014/0343984 A1 | 11/2014 | Shahabi et al. |
| 2014/0379399 A1 | 12/2014 | Brydon et al. |
| 2015/0032533 A1 | 1/2015 | Raab et al. |
| 2015/0178742 A1 | 6/2015 | Smith et al. |
| 2015/0205760 A1* | 7/2015 | Hershey ................ G06N 20/00 702/181 |
| 2015/0213315 A1 | 7/2015 | Gross |
| 2015/0254593 A1 | 9/2015 | Rinze et al. |
| 2015/0347520 A1 | 12/2015 | King et al. |
| 2015/0356489 A1 | 12/2015 | Kazai et al. |
| 2016/0027051 A1 | 1/2016 | Gross |
| 2016/0078499 A1 | 3/2016 | Brown et al. |
| 2016/0110775 A1 | 4/2016 | Moiz et al. |
| 2016/0148245 A1 | 5/2016 | Celis et al. |
| 2016/0180365 A1 | 6/2016 | Shi et al. |
| 2016/0253710 A1* | 9/2016 | Publicover ........ G06F 16/24575 705/14.66 |
| 2016/0350697 A1 | 12/2016 | Gruen |
| 2017/0032586 A1* | 2/2017 | Cheatham, III .. H04M 1/72457 |
| 2017/0053330 A1* | 2/2017 | Smith ................ G06Q 30/0613 |
| 2017/0098197 A1* | 4/2017 | Yu .......................... G06Q 30/02 |
| 2017/0221156 A1 | 8/2017 | Mingarelli et al. |
| 2017/0249574 A1 | 8/2017 | Knijnik et al. |
| 2017/0331877 A1 | 11/2017 | Balasubramanian et al. |
| 2018/0293616 A1 | 10/2018 | Greenhood |
| 2018/0295548 A1 | 10/2018 | Kumar et al. |
| 2019/0377572 A1 | 12/2019 | Mograbi-Lapiner et al. |
| 2022/0083995 A1 | 3/2022 | Flowers et al. |

OTHER PUBLICATIONS

Applying the service profit chain in a retail environment: Challenging the "Satisfaction mirror", R. Silvestro, S. Cross—International Jounral of Service Industry . . . , 2000—emeraldinsignt.com (Year: 2000).

"Applying the service profit chain to analyse retail performance: the case of the managerial strait-jacket?" M. Pritchard, R. Silvestro—International Journal of Service . . . , 2005—emeraldinsight.com (Year: 2015).

J. Dawes, B. Sharp—Australian Jornal of Market Research,—rearchgate.net "The reliability and validity of objective measures of customer service; mystery shopping" (2000).

W. Hensens—Journal of Tourism Futures—The future of hotel rating; emeraldinsight.com (2015).

Transferring Knowledge from a Crowd to a Retail Company—A case study of Roamier Sweden S. Gistera, M. Carlander—2015—diva-portal.org (2015).

"A Conceptual Model for Mystery Shopping Motivations", P. Allison, D. Severt, D. Dickson—Journal of Hospitality Marketing & . . . , 2010—Taylor & Francis (2010).

Exploring the Consequences of Shopper-Facing Technologies: Their Effect on Shopper Experiences and Shopping Outcomes; BI Spaid—2014—trace.tennessee.edu (2014).

Morse, David; "MINISIZE2: A computer program for determining effect size and minimum sample size for statistical significance for univariate, multivariate, and nonparametric tests", Educational and Psychological Measurement; 1999—journals.sagepub.com (Year: 1999).

"Crowdforge: Crowdsourcing complex work", A.Kittur, B. Smus, S. Khamkar, RE Kraut—Proceedings of the 24th annuity . . . , 2011—dl.acm.org (Year: 2011).

"Quality control in crowdsourcing systems: Issues and directions" M. Allahbakhsh, B. Benatallah, A. Ignjatovic . . . —IEEE Internet . . . , 2013—ieeexplore.ieee.org (Year: 2013).

Position validation in crowdsourced accessibility mapping; RM Rice, AO Aburizaiza, MT Rice . . .—. . . : The International Journal . . . , 2016—utpjournals.press (Year: 2016).

http://web.archive.org/web/20150226150240/http://www.gigwalk.com/crowdsourcing (Year: 2015).

http://web.archive.org/web/20150223140532/http://www.gigwalk.com/case-study/Gigwalk_mobileretail_whitesheet.html (Year: 2015).

The motivations and experiences of the on-demand mobile workforce; R. Teodoro, P. Ozturk, M. Naaman, W. Mason . . . —Proceedings of the 17th . . . , 2014—dl.acm.org (Year: 2014).

Kumar et al., "Significance of Hash Value Generation in Digital Forensic", Jul. 2012, International Journal of Engineering Research and Development, vol. 2, Issue 5, pp. 64-70 (Year: 2012).

Harvard Law School; "What is Metada?" The Wayback Machine—https://web.archive.org/web/20160522163145/http://hsl.harvard.edu/dept.its/what-is-metadata/; pp. 1-2; (Year: 2021).

Davis et al.; "Mobile Media Metadata for Mobile Imaging", 2000, IEEE International Conference on Multimedia and Expo (ICME); pp. 1701-1710 (Year: 2004).

\* cited by examiner

| CAMPAIGN 300 | Total Cost Outlay 310 |
| --- | --- |
| | Cost per Observation 311 |
| | Total Number of Observations 312 |
| | Time Frame 313 |
| | Geographic Limitations 314 |
| | Diminishing Cost per Observation 315 |
| | Observer Reputation Limitations 316 |
| | Variable Cost Per Transaction 317 |
| | Failure Parameters 318 |
| | Image Quality Parameters 319 |
| | Opportunity/Acceptance Lockout 320 |
| | Observation Success Termination 321 |

SYSTEM AND METHOD FOR USING USER RATING IN REAL-WORLD DATA OBSERVATION CAMPAIGN

CROSS REFERENCE TO RELATED APPLICATION

This application claims benefit of U.S. Provisional Application 62/426,025, entitled "System and Method for Using User Rating in Real-World Data Observation Campaign," filed Nov. 23, 2016, which is incorporated herein by reference in its entirety for all purposes.

BACKGROUND

Individuals and businesses often desire to collect data about various situations that exist in the real-world. For example, a manufacturer of a product may wish to collect data about how the product is being displayed or marketed at a retail location. However, individuals and enterprises, and government and non-governmental agencies, often do not have the time and/or resources available to travel to myriad locations or employ agents to do so to collect information. This challenge becomes greater as the time window for the information collection becomes more specific and/or the physical locations from which the information is to be collected grow in number or distance. For example, merchants or entities in the delivery chain of products for retail sale, whether manufacturers, distributors, wholesalers, brokers, or the like, may need to determine if, when, how much, in what way or condition, whether accompanied by marketing material, or at what price their goods are being made available to consumers. Another example of such a need for information gathered from a location might be a property or business owner that contracts for a periodic service, about which they would like to validate the quality and completeness of the service delivery. In short, the condition of physical locations or some physically observable condition at the locations is often desirable data to observe, obtain, and document.

Sometimes these needs for data occur in a predictable or recurring pattern. In some cases, the data may also be best obtained within a narrow time window. For example, merchants who sell goods and products through retailers often have guidelines, rules, and restrictions regarding how retailers are expected to present and price the goods and products at the purchase location. Merchants (or other entities) may wish to negotiate with retailers for specific shelf space for the merchant's goods and products, or the merchant may wish to disallow lowering of the retail price for the merchant's goods and products overall, at a specific location, or during a specific time period.

Individuals and business wishing to obtain observable real-world data for purposes of confirming the proper display, pricing, or other characteristic of how a product or service is being offered to consumers may hire staff to ensure that the various standards, conditions, guidelines, rules, and/or restrictions are met. That is, employees or agents may travel to various locations at various times to observe and collect real-world data with regard to various conditions, guidelines, rules, and/or restrictions in order to ensure satisfaction and compliance. Of course, such employees and agents can be expensive in terms of payroll and travel expenses. Therefore, organizations often must rely on others (such as retailers) to follow the negotiated conditions, guidelines, rules, and restrictions. However, at times, those other actors have little incentive to go to any great effort to ensure that standards or conditions are met or to ensure compliance with applicable guidelines, rules, and/or restrictions. As a result, many businesses are unable to ensure that their standards, conditions, guidelines, rules, and/or restrictions are followed with regularity or that deviations from the approved policies or rules are noted and corrected.

Embodiments of the system, apparatuses, processes, methods, and operations described herein are directed to overcoming these and other limitations of conventional approaches, both individually and in combination.

SUMMARY

The terms "invention," "the invention," "this invention" and "the present invention" as used herein are intended to refer broadly to all subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required or essential features of the claimed subject matter, nor is it intended to be used in isolation to determine the scope of the claimed subject matter. The subject matter should be understood by reference to appropriate portions of the entire specification of this patent, to any or all drawings, and to each claim.

One or more embodiments of the invention are directed to systems, apparatuses, processes, methods and operations for implementing and managing a data collection campaign for data derived from the observation of product or service related information. In some embodiments, the invention is directed to systems, apparatuses, processes, methods, and operations for enabling an observation campaign to be defined and executed. As part of that design and execution, a user's or prospective user's rating may be accessed and used to decide whether to make a specific opportunity or set of opportunities available to a specific user, to process the data received from a certain user in a certain way, what the compensation for participating in an observation campaign will be, or what the rules are that determine when a campaign or an observer's participation in a campaign are completed. Further, as part of that design and execution, in some embodiments, the invention is directed to systems, apparatuses, processes, methods, and operations for enabling an observation campaign to be evaluated, and if desired, modified, based on sales or other data obtained from a merchant or place of business. In some embodiments, a communication or instruction may be generated and provided to a user/observer participant in an observation campaign requesting that they alter some aspect of the setting or environment in which a product is being sold or offered for sale. In some embodiments, such a communication may be provided to a proprietor of a sales location or to a campaign coordinator so that they are aware of a problem with the way a product or service is being marketed or displayed and can take remedial actions if desired.

In one embodiment, the system and methods described herein are directed to a computer-based method, where the method includes accessing information regarding a set of one or more prospective users or observers for an observation opportunity, for each of the set of prospective users, obtaining information regarding a user rating for that user, for each user of the set of prospective users, determining if the user's rating meets or exceeds a previously determined rating value or requirement, if the user rating for a user exceeds the previously determined rating value or requirement, then sending an electronic communication corresponding to an opportunity to observe real-world data to that user, the electronic communication sent to one or more remote computing devices associated with that user from a data observation computing platform, receiving a response to the electronic communication from one or more of the users to which the communication was sent, the response including data corresponding to an observation of real-world data, for each received response, determining whether the received response fulfills the opportunity, and if a received response fulfills the opportunity, then initiating compensation to the user who provided the response.

In another embodiment, the system and methods described herein are directed to a computing system, where the system includes a user-based mobile computing device configured to execute an observation application to coordinate observing and collecting of real world data, an observation server computer configured to push a notification that includes one or more opportunities for observations of real-world data to the user-based mobile computing device and configured to receive real-world data observed and collected by the user-based mobile computing device, a computer-based method executing on the observation server computer to process the real-world data observed and collected by the user-based mobile computing device, the processing of the real-world data including obtaining information regarding a user rating for a user associated with the user-based mobile computing device, determining if the user's rating meets or exceeds a previously determined rating value or requirement, if the user's rating exceeds the previously determined rating value or requirement, then processing the real-world data to evaluate the real-world data and if the user's rating does not exceed the previously determined rating value or requirement, then not processing the real-world data further; and a merchant-based computing device communicatively coupled to the observation server computer and configured to generate and control a campaign of opportunities pushed by the observation server computer.

In yet another embodiment, the system and methods described herein are directed to a cloud-based multi-user observation computing system, where the system includes a plurality of user-based mobile computing devices each executing an observation application configured to communicate with a server computer hosting observation opportunities, a cloud-based observation platform that includes the server computer for hosting the observation opportunities, the observation platform configured to communicate one or more opportunities to one or more user-based mobile computing devices and configured to receive real world data collected by one or more of the one or more user-based mobile computing devices, a computer-based method executing on the observation platform to process the real-world data observed and collected by the one or more user-based mobile computing devices, the processing of the real-world data including obtaining information regarding a user rating for a user associated with each of the one or more user-based mobile computing devices from which data is received, for each user for which a user rating is obtained, determining if the user's rating meets or exceeds a previously determined rating value or requirement, if the user's rating exceeds the previously determined rating value or requirement, then processing the real-world data received from the user-based mobile associated with that user and if the user's rating does not exceed the previously determined rating value or requirement, then not processing the real-world data received from the user-based mobile associated with that user, and a plurality of merchant-based computing devices communicatively coupled to the observation platform and configured to generate and alter opportunities as part of one or more observation campaigns, each observation campaign having configurable parameters configurable by at least one of the merchant-based computing devices.

Other objects and advantages of the present invention will be apparent to one of ordinary skill in the art upon review of the detailed description of the present invention and the included figures.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. These systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, embodiments of the systems and methods discussed herein may be directed to an observation platform for coordinators, merchants, retailers, and users to establish, utilize and fulfill an observation campaign suited to obtain, collect, and verify observable or detectable real-world data related to standards, conditions, rules, guidelines, and/or restrictions regarding the placement, display, and advertising or marketing of products and services. In some cases, the observable data may be part of an overall strategy in an observation campaign established by an observation campaign coordinator. Such a strategy may involve determining data such as (or related to) specific product placement, product pricing, collateral materials, and product incentives at a retail location. A participant or prospective participant in an observation campaign (referred to as a user or observer herein), may use an application downloaded to and executing on a computing device, to identify an opportunity to participate in an observation campaign and/or to capture specific observation campaign related data and information. For example, an observation campaign may include a set of verifiable parameters that define specific characteristics of an observation campaign strategy. These verifiable parameters may include specific observable and verifiable real-world data such as where a product is placed on a retail shelf, whether promotional materials are displayed with the product, inventory count, and/or product pricing.

Once an observation campaign opportunity is created and made available to observers, it may be "discovered" or identified (via a suitable search function and/or application) and accepted by a user/observer. The user may then collect the real-world data through various methods including, key entry, temperature observance, sound recording, video recording, barometric pressure observance, sound-pressure level observance and image capture (using one or more applications executing on a computing device, such as a mobile phone). The captured real-world data may then be uploaded to the observation platform in order to determine if the parameters of the observation campaign have been met (e.g., correct data, a sufficiently clear image, timely collection, and the like). Based on an evaluation of the collected real-world data and/or other aspects of the user's performance, each user may be associated with a user rating that reflects the user's "quality" or "reliability" as an observer or source of data for a campaign. Further, the user's rating may increase or decrease based on a number of factors, including successful data collections, quality of collected data, utility of collected data, frequency of data collections, and timeliness of data collections. These and other aspects are described in greater detail below with respect to FIGS. 1-6.

Figure 1:
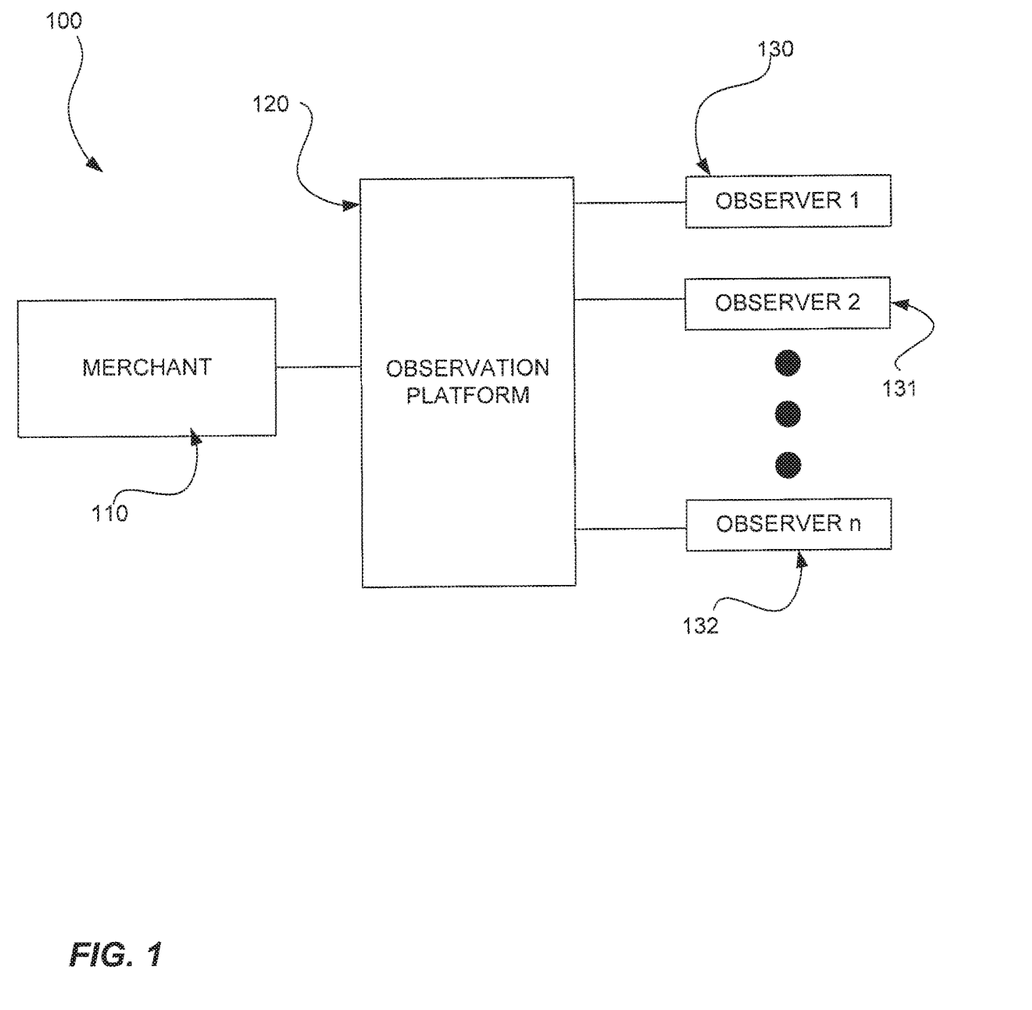
FIG. 1 is a basic block diagram illustrating elements or components of an example system in which an embodiment of the subject matter disclosed herein may be implemented.

FIG. 1 is a basic block diagram illustrating elements or components of an example system 100 in which an embodiment of the subject matter disclosed herein may be implemented. In the context of FIG. 1 and other figures, a continuing example of a merchant-based observation campaign will be used. Thus, various real-world data points specific to a merchant that sells goods at retail locations will also be used in this context. However, a skilled artisan will understand that the coordinator of an observation campaign need not be a merchant with merchant-specific data points. For example, a coordinator of an observation campaign may be a quality-assurance coordinator seeking to collect data about installations of observable projects, e.g., power transmission pole installations, bathroom conditions in a public transit location, traffic conditions, and the like. In short, a coordinator of an observation campaign may be any individual, business, government agency, or entity that wishes to incentivize observers to collect real-world data from myriad locations. However, for ease of illustration and for consistent examples, the remaining disclosure will use the merchant product and retail location example without limiting the interpretation or scope of the claims or specification.

As discussed briefly above in an overview, an observation platform 120 provides systems and methods for a merchant 110 to propose, establish, and implement an observation campaign for various observers 130, 131, and 132 to collect real world data about the observation campaign established by the merchant 110. In this system 100, the merchant block 110, the observation platform block 120 and each observer block 130, 131, and 132 may represent a separate computing device or group of computing devices. Further, the connections between these computing devices may be any communication link, such as the Internet, BlueTooth™ wireless, direct serial link, and the like. The various computing device implementations and embodiments are discussed further below.

The observation platform 120 may be embodied in whole or in part as a computing system that includes one or more server computers configured in a cloud-based computing environment. Embodiments may take the form of a hardware implemented embodiment, a software implemented embodiment, or an embodiment combining software and hardware aspects. Further, various computing aspects of the underlying systems and methods may transcend any specific computing entity and the "block" diagram nature of FIG. 1 is intended to illustrate one embodiment. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in or on a suitable non-transitory data storage element (i.e., any suitable medium other than a transient waveform). In some embodiments, one or more of the operations, functions, processes, or methods described herein may be implemented by a specialized form of hardware, such as a programmable gate array, application specific integrated circuit (ASIC), or the like. This detailed description is, therefore, not to be taken in a limiting sense.

As alluded to, in some embodiments, the subject matter may be implemented in the context of a "cloud" based computing environment typically used to develop and provide web services and business applications for end users. Further aspects of an exemplary implementation environment will be described with reference to FIGS. 2-5 below. Note that embodiments may also be implemented in the context of other computing or operational environments or systems, such as for an individual business data processing system, a private network used with a plurality of client terminals, a remote or on-site data processing system, another form of client-server architecture, and the like.

The merchant computing device 110 may also be one or more of any number of computing device implementations. In one embodiment, the merchant computing device 110 may be a personal computer or mobile computing device. The merchant computing device 110 may be communicatively coupled to the observation platform 120 through an Internet connection or other communication network. Further, the merchant computing device 110 may be configured to execute a merchant observation application (not shown) that may provide various graphical user interfaces (GUIs) for a merchant to navigate and utilize the observation platform 120, such as, for example, defining and establishing an observation campaign. Various operations and parameters of the merchant computing device 110 are described further below with respect to FIG. 2.

Each observer computing device 130, 131, and 132 may also be one or more of any number of computing device implementations. In one embodiment, each observer computing device 130, 131, and 132 may be a mobile computing device (such as for, example, a mobile phone, a smart phone, a tablet, or a laptop computer). Each observer computing device 130, 131, and 132 may be communicatively coupled to the observation platform 120 through an Internet connection or other communication network. Further, each observer computing device 130, 131, and 132 may be configured to execute an observer application (not shown) that may provide various GUIs for an observer to navigate and utilize the observation platform 120, such as, for example, fulfilling an opportunity in an observation campaign by accepting the opportunity and submitting observed and collected data, etc. Various operations and parameters of the observer computing devices 130, 131, and 132 are also described further below with respect to FIG. 2.

Figure 2:
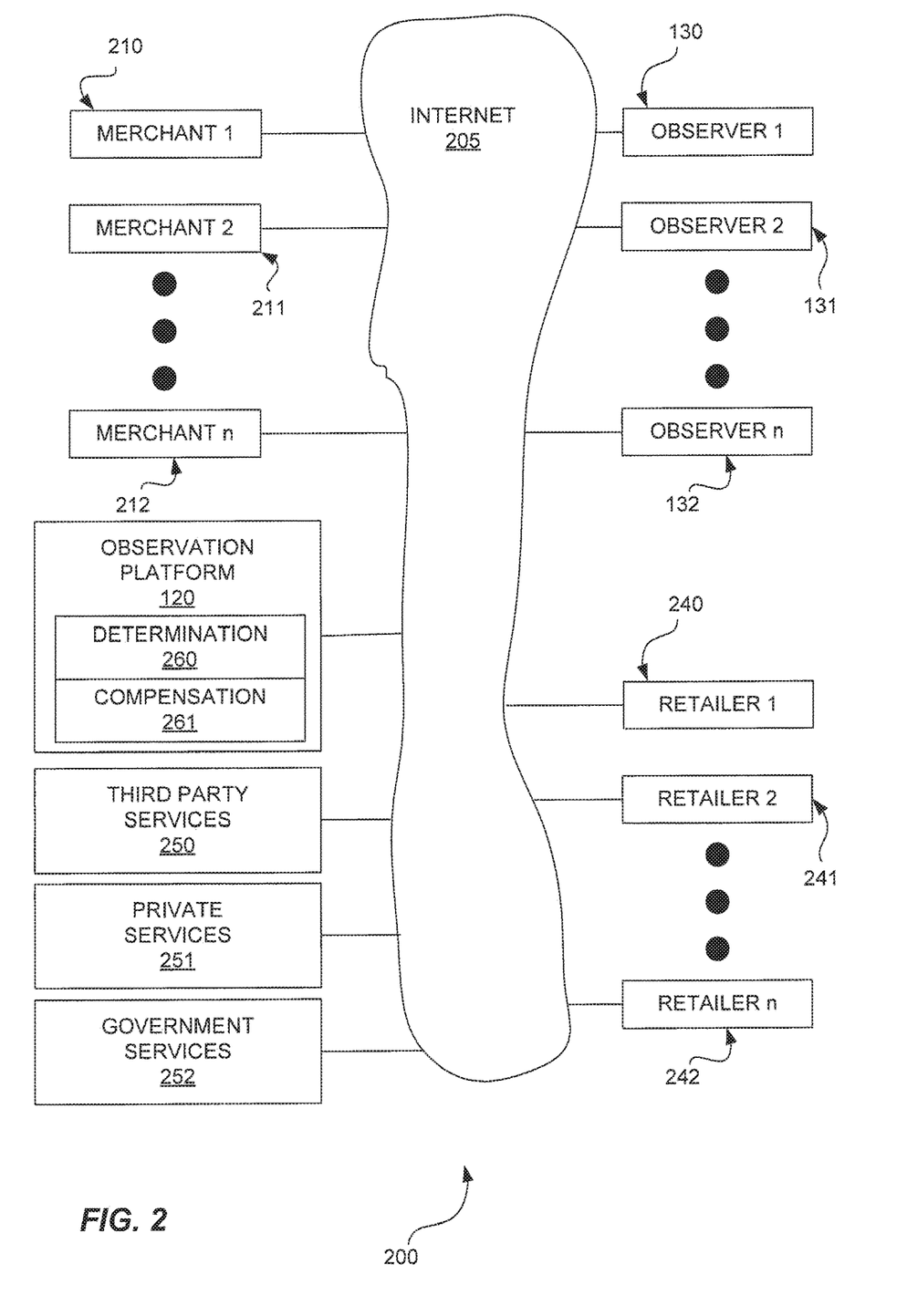
FIG. 2 is a more detailed block diagram of the basic system of FIG. 1 illustrating elements or components of an example system in which an embodiment of the subject matter disclosed herein may be implemented.

FIG. 2 is a more detailed block diagram of the basic system of FIG. 1 illustrating elements or components of an example system 200 in which an embodiment of the subject matter disclosed herein may be implemented. Some elements of FIG. 1 are also shown in FIG. 2 and bear the same reference numerals. In particular, the observation platform 120 may be coupled to computer network 205 such as the Internet, just as observer computing device 130, 132, and 132 are also connected via the network 205. A skilled artisan will understand that the designation of observer 1 130 through observer n 132 indicates that any number of observers/users may be shown as interfacing with the system 200 (whether such interfacing is discrete or collaborative). In this system 200 embodiment, more than one merchant computing device is shown. Thus, merchant computing devices 210, 211, and 212 may represent different merchants who may individually and independently craft observation campaigns using the observation platform 120 via the network 205. A skilled artisan will understand that the designation of merchant 1 210 through merchant n 212 indicates that any number of merchants may be shown as interfacing with the system 200.

Additional computing devices may also be communicatively coupled to the observation platform 120 via the computer network 205. As will be discussed further below, the system 200 may include a number of retailer computing devices 240, 241, and 242. A skilled artisan will understand that the designation of retailer 1 240 through retailer n 242 indicates that any number of retailers may be shown as interfacing with the system 200. Further, the system 200 may include computing devices associated with third party services 250, private services 251, and government services 252. Prior to discussing the additional roles for these additional computing devices, the observation platform 120 as well as the observers' and merchants' roles are discussed in greater detail.

By way of a general overview of the system in FIG. 2, one embodiment may include a user-based mobile computing device 130 (e.g., a mobile phone, a smart phone, a laptop computer, tablet, or handheld computer, a wearable computing device, an augmented reality device, and the like) configured to execute an observation application to coordinate observing and collecting of real-world data. Further, the system may include an observation server computer 120 configured to send notifications that include one or more opportunities for observations of real-word data to the user-based mobile computing device(s) 130 and configured to receive real world data observed and collected by the user-based mobile computing device(s) 130. Further yet, the system may include a merchant-based computing device 210 communicatively coupled to the observation server computer 120 and configured to generate and control a campaign of opportunities sent by the observation server computer 120.

As briefly discussed above, the observation platform 120 may be one or more computing devices configured to work as a server computing entity in a cloud-based computing environment to establish and facilitate observation campaigns for one or more merchants. As used throughout this disclosure, an observation campaign is a set of parameters established by a merchant using one or more inter-related applications operating in the system 200 and coordinated from the observation platform 120. The observation campaign may include a number of parameters designed to encourage various remote users of an observation application (e.g., observers interacting with a mobile device in which is installed such an application) to collect real-world data about products and goods for sale at various retail locations, or the status of a service being provided at a location.

The campaign may collect both qualitative and quantitative information for calculating ROI on marketing expenses. Qualitative examples may include: is the display appealing, did you like the taste of the yogurt, does the security make you feel safe and if not why not? Quantitative examples may include: Is the price 5.99, what is the price, what is the count, service took less than 5 minutes, the lawn was mowed, was the ATM was working. The data format of the campaign is standardized so that the answers can be compared both across locations, but also across time (historical) in the same locations. The campaign may be to compare the results against a standard or assist in validating a prediction.

In some embodiments or use cases, a merchant that establishes an observation campaign using the observation platform 120 desires to know more about the retail locations and point of sale for their goods and products in the marketplace. For example, a merchant may negotiate a deal to have products placed in specific eye-level locations on shelves at retail locations and may wish to verify that the products are, in fact, placed on eye-level shelves at the various retail locations. In other cases, a goal of a campaign might be to measure project progress (is the construction site leveled?), determine asset status (is a backup power generator present in all building locations?), evaluate supply chain delivery (was the correct medicine delivered without being exposed to heat?), validate a machine learning prediction (did the computer accurately predict the size of the queue at the cash register at lunchtime?).

By establishing an observation campaign that leads to the collection of real-world data (e.g., digital images of the product for sale on eye-level shelves at a particular retail location), the merchant can incentivize observers (e.g., through compensation offered by the observation platform) to fulfill the requirements of the specific real-world data collection. That is, the merchant may implement an observation campaign through a contract with a proprietor or operator of the observation platform such that the observation platform then offers monetary compensation to one or more observers in exchange for a timely and meaningful collection of real-world data (e.g., a picture) of the merchant's product for sale at a specific retail location. This eliminates the need for the merchant to employ one or more individuals to travel to the retail location to collect and verify such real-world data. In a sense, this is a form of crowd-sourcing the data collection process for a campaign.

Note that as used herein, the term "real-world data" may refer to specific observable facts or data about anything of interest to the coordinator of the campaign. Real-world data may be data that can be collected in the real world (as opposed to data that may reside on a retailer's computer). In one example, real-world data may be a digital image of a product for sale at a retail location such that useful data may be gleaned from the image, such as the product location on a shelf, the product location in proximity to other products, if the product label is facing outwards, if the product price can be seen, if the product price is correct, if additional promotional material is proximate, and the like. Real-world data includes, but is not limited to, any observable verifiable data collectable through any manner of sensing, recording, or observing.

In this manner, a merchant can use the observation platform to design an observation campaign to incentivize observers to collect very specific kinds of real-world data at very specific locations over very specific time frames. In one example, when designing an observation campaign, the merchant may establish observation opportunities based on a desired time frame; for example, a campaign may only have opportunities offered for a one-week time frame or just a few hours in any given day. Further, the merchant may establish observation opportunities based on a desired location such as retail locations in a specific city or within 100 miles of a particular location. Further yet, the merchant may establish observation opportunities based on a desired total number of observations—e.g., a "cap" of 10 different successful observations. Other possible campaign parameters are possible and discussed further below with respect to FIG. 3.

As opportunities for observation become active (that is, users of the observer application may be offered opportunities via the application) various observers may engage in the various opportunities. Opportunities may be sent as notifications to observers (via a smart phone application and the like). Such notifications may be influenced or determined by geographic location of various observers (e.g., notifications are only sent to observers proximate to a desired observation retail location). Further, such notification may be influenced by a relative reputation of an observer (e.g., only the "best" or most effective observers receive certain opportunities, such as those having a user rating above a specified threshold value).

A basis for deciding whether or not to notify or invite someone to participate in an observation campaign might also include: when was the last time they did an observation, how many have they had rejected, what did they get paid to do a similar observation, what type of equipment do they have (high vs low quality camera), what are their provable skills (speak a certain language).

Once an opportunity is received or otherwise made known to a prospective user/observer (such as by receiving a notification generated by the Observation Campaign Platform, performing a search of a set of available opportunities, receiving a message via a messaging application, etc.), the observer may accept the opportunity and begin an observation (i.e., a collection of data or information). Some opportunities may have time limits for acceptance of the opportunity and/or time limits for fulfillment of an accepted opportunity. In some examples, the observation may be executed by simply sending the requested real-world data to the observation platform 120 for evaluation. The observation platform may include a module for determining 260 whether the received real-world data from any observer meets the requirements and parameters of an opportunity in an active observation campaign. The determination module 260 may be configured to determine if the received real-world data from the observer (e.g., sent from a user-based mobile computing device) fulfills one or more criteria for data collection in the observation campaign opportunity.

Such criteria may include, but are not limited to (or required to include) timeliness, image quality, data applicability, data completeness and the like. Note that the criteria may depend upon characteristics of the campaign, but in general relate to a provable quality of the data. For example, if the data is an image, is it not blurry and of the right areas in a store?; if the data is a video, is it long enough?; if the data is an opinion, is it clearly written; if the data is quantitative, does it match what shows up in the pictures/videos; were the campaign instructions followed correctly?; timing issues—how long did it take the person to obtain the real-world data after they accepted?; were there unusual support needs—did the person require excessive assistance to complete the tasks involved? Note that in some cases, any problems with the collection process or data quality may lower a user rating; for example, accepting an observation opportunity and not properly completing the tasks will typically lower a user's rating. Conversely, accepting opportunities and completing the tasks quickly and correctly may raise a user's rating, as would receiving positive feedback from an end customer.

If the determination module 260 determines that the received real-world data from an observer meets the requirements of an observation opportunity, (e.g., the opportunity has been fulfilled), then a compensation module 261 may initiate compensation to the observer for successfully fulfilling an observation campaign opportunity. Such compensation may be financial or non-financial. In one embodiment, the compensation module 261 may communicate with one or more third-party services to credit a bank account associated with the observer or observers that fulfilled the opportunity. Further, the compensation module may also track total financial compensation paid to specific observers and communicate said total to government services 252 on an annual or other periodic basis for purposes of compliance with any relevant regulations or laws. In other embodiments, the compensation module 261 may communicate with other private services 251, such as social media or online retail, to provide non-financial remuneration to the observer. For example, the observer may qualify for discounts or privileges at third party locations (e.g., food coupons, gift cards, free entry into a sporting event, and the like).

Figure 3:
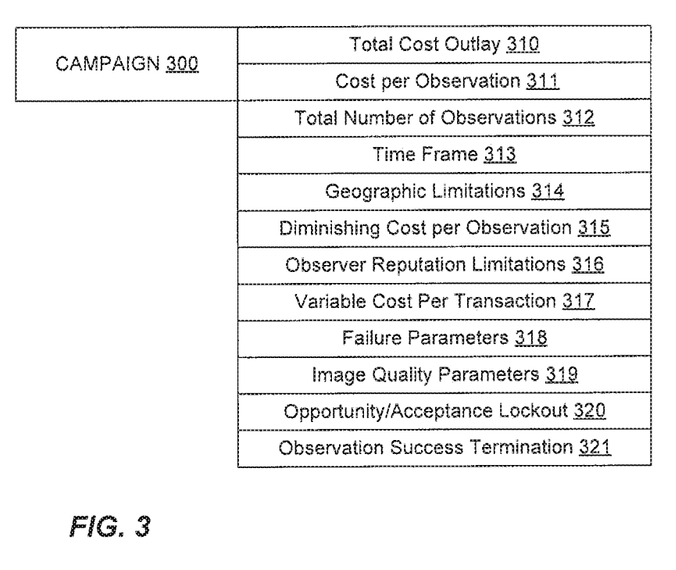
FIG. 3 is a data structure diagram illustrating parameters of an example observation campaign used in conjunction with the system of FIG. 2 according to an embodiment of the subject matter disclosed herein.

FIG. 3 is a data structure diagram illustrating parameters of an example observation campaign 300 used in conjunction with the system of FIG. 2 according to an embodiment of the subject matter disclosed herein. As discussed above, one or more merchants (210-212 of FIG. 2) may establish and coordinate an observation campaign with several different configurable parameters. FIG. 3 is an illustration of a data structure of one embodiment of an observation campaign 300. It is understood that the parameters shown in FIG. 3 are illustrative and any number or type of parameters (either similar or different, and greater or fewer than shown in FIG. 3) may be present. These parameters assist in shaping how observers will be incentivized to collect real world data in response to opportunities presented in the campaign 300. It is also understood that certain identification and demographic parameters (such as merchant name, merchant product, bank data, and the like) may also be established with respect to the merchant. These are not discussed in further detail here as the focus of FIG. 3 is on the customizable parameters of an observation campaign 300.

A first parameter by which a merchant (or other entity seeking to incentivize the collection of real-world data for purposes of confirming the proper adherence to rules or requests regarding the display or other characteristics of a product being offered for sale at a location) may customize an observation campaign 300 is a total cost outlay 310. In this respect, the merchant and the proprietor of the observation platform reach an agreement about the total cost of the observation campaign. The observation platform may then set specific compensation rates for successful observation in order to meet the needs of the established observation campaign. Further, the merchant or the observation platform may choose to designate a maximum (or minimum) amount of financial compensation to be awarded to an observer or observers for successfully retrieving real-world data in fulfillment of an observation opportunity. This may be an aggregated amount on a per campaign basis. For example, a merchant may wish to collect data about as many product placements as possible until a threshold amount of money has been reached (in terms of financial compensation to all observers in an aggregate manner). This total may also be an aggregate cost outlay for non-financial outlay (e.g., a limit of 10 discount coupons awarded).

The observation platform operator or manager may also change the compensation offered based on user rating or timing; for example, the compensation offered may be adjusted based on how much time is left in the campaign or the value of a user rating. In one case, the compensation might start at a price of $5.00, which would be offered for 5 days; if this failed to attract enough participants or qualified participants, then the compensation offered might be increased by $1 to try and complete the campaign. Similarly, the compensation offered might depend upon a user or observer rating; in this case, it may be desired to attract a certain number or percentage of "qualified" or more reliable observers by offering greater compensation to those having a higher rating or a rating above a specified threshold.

In addition to the total cost outlay, the merchant may also configure a parameter associated with a total cost per observation 311. In this manner, the individual observation may be capped at a maximum amount of financial or non-financial compensation. The merchant may also define a minimum cost per observation and can establish a sliding scale for cost per observation according to a number of different variables. For example, the merchant may choose to pay more per observation for the first 10 observations and then drop the cost per observation. As another example, the cost per observation may be higher during a particular time period, such as late night and then lower during a different time period, such as morning. Thus, additional parameters regarding variable cost per transaction 317 may be configured.

The merchant may configure a parameter associated with a total number of observations 312. In this manner, each observation may be counted and once a limit has been reached, the campaign may be suspended or terminated. The merchant may also define a minimum number of observations needed in order for a campaign to end at a time limit or within a time frame 313. Still further, the merchant may establish a fixed time frame 313 in which the campaign must begin and end. For example, the merchant may choose to establish a time frame of June 1 to June 30 for which a total number of observations is limited to 1000; in this case, once 1000 observations are reached, the campaign may end. Also, the merchant may establish 100 observations as a minimum threshold in which case, the campaign can only end on June 30 if 100 observations are entered.

The merchant may configure a parameter associated with a geographic limitation or boundary 314 of the campaign. Several geographic parameters may be established, such as a relative geographic limit of a state, city of country or an absolute geographic limit of within 500 miles of a specific location (company headquarters, for example). There may be additional parameters about limiting the number of observation within geographic regions or limiting the total cost outlay associated with a geographic region. Further yet, cost per observation may be configured on a per region basis (e.g., paying more for region 1 than region 2).

The merchant may configure a parameter associated with a diminishing cost per observation 315, choosing to pay more for initial observations as compared to later observations. In another example, the parameters may be reversed to pay more for each additional observation after a certain threshold has been reached. Further, the merchant may limit observers who can participate in a campaign to only those observers who have reached a specific observer reputation score or ranking 316.

Additional parameters in a campaign may include failure parameters 318 that may act to suspend or terminate a campaign if a threshold of failed observations is entered or the real-world data collected in initial observations indicates that additional failures will be imminent or predictable. There may be restrictions on the type and quality of images received from observers based on image quality parameters 319. The merchant may establish opportunity lockout parameters 320 for observers who accept an opportunity and are then given two hours of exclusivity to the opportunity to fulfill it. Lastly, in this embodiment, a merchant may define a successful campaign termination parameter 321 so that a campaign may end when a threshold number of successful observations has been reached or a statistically valid number of successful observations is reached. Note that there are additional parameters that may be configured in an observation campaign 300, but are not described in as much detail herein.

As an example, suppose that a campaign is measuring several store brands (e.g., Safeway, PCC) and it is noticed that based on data collected for an observation campaign, one of the two is performing poorly/perfectly. In this case, the campaign may be temporarily suspended to provide time for an investigation into the causes or issues involved. Similarly, campaigns may be increased in scope/size based on failure rates, and recurring campaigns may be started/paused based on failure rates. Further, based on ongoing results of a campaign, the questions, task description, locations for data collection may be changed, added, or reordered automatically by the platform/system. Note that a machine learning model or another form of data analysis may be used to improve the selection of the primary or secondary campaign parameters. For example, based on historical data and the campaign parameters (type of product, locations [rural, urban, etc.]), a campaign coordinator may choose locations based on predicted bad locations. Questions can be changed, added, or reordered based on predicted results. Pricing of the compensation may be set based on the predicted speed/quality of the observers that would be expected to perform the observations and data collection.

Figure 4:
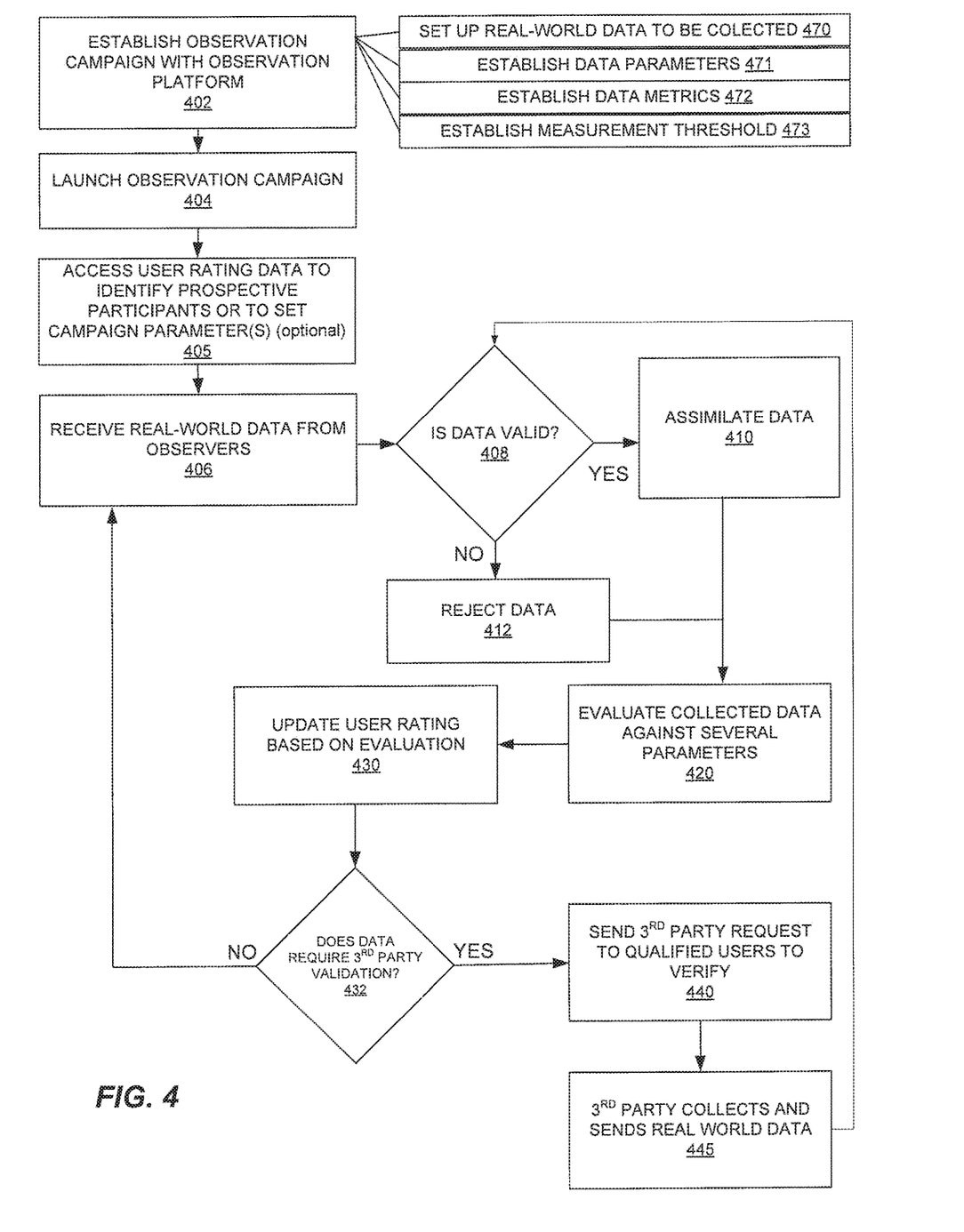
FIG. 4 is a flow chart or flow diagram illustrating a method, process, operation or function for establishing, managing, administering, and updating or modifying a real-world data observation campaign based on a user/observer rating, according to an embodiment of the subject matter disclosed herein.

FIG. 4 is a flow chart or flow diagram illustrating a method, process, operation or function for establishing, managing, administering, and updating or modifying a real-world data observation campaign based on a user/observer rating, according to an embodiment of the subject matter disclosed herein. As mentioned, an observation campaign may be established with a number of parameters chosen by the campaign coordinator to incentivize collection of real-world data that suits the needs of the campaign coordinator.

However, as recognized by the inventors, in a complex environment implemented on a cloud platform involving many unrelated individuals, a great amount of guess work may be involved in establishing the initial values of the parameters of an observation campaign. This introduces an element of uncertainty with regards to the effectiveness of the campaign as it is initially formulated and with regards to the value of the information collected, since information may satisfy the parameters of the observation campaign but fail to be satisfactory for use in further processing or evaluation. Thus, a campaign coordinator may also establish metrics involving specific parameters of the campaign (as suggested by step or element 472 of FIG. 4), where a result of comparing the collected real-world data (or information/metadata about that real-world data) to one or more of the metrics may result in altering or modifying a parameter of the campaign.

As an example, an observation campaign may establish a specific geographic location having a perimeter surrounding a map point (e.g., a radius of one mile surrounding a location). In one embodiment, any potential observer that travels into the one-mile radius region may then receive an alert via an observation application executing on the observer's smart phone, with the alert indicating that an observation opportunity is available. However, a metric may be established that tracks the number of observations performed over a set time period. Thus, if 24 hours pass without a single observation (or without a sufficient number to indicate that enough information has been collected), this metric may be used as the basis for altering the one-mile radius parameter that controls which potential observers are notified. For example, the radius may be increased to two miles or three miles and then the collected information or number of fulfilled observation opportunities again compared to the metric for the parameter.

As another example, an observation campaign may be established providing opportunities to observers that offers a $5.00 payment in return for a valid observation. After a set period of time or after a set number of submitted observations, the rate of successful (i.e., acceptable or valid) observations over the time period may be analyzed against a metric. In one embodiment, this analysis may determine that the observation campaign is returning more observations than what is required for meaningful, statistical conclusions to be drawn about the real-world data. As a result, the observation campaign parameter regarding payment offered per observation may be reduced from $5.00 to $3.00 to reduce the number of potential observers being incentivized to collect data for that observation campaign.

Thus, a system and method may be established wherein the observation campaign platform receives electronic communications from one or more remote computing devices (user's/observer's smart phones, for example) wherein each electronic communication includes real-world data corresponding to parameters of an observation campaign (such as an image of a product on display, an observer's notes regarding the general condition of the location, a description of collateral information available near the product, etc.). The observation campaign platform then analyzes the received real-world data against a metric corresponding to (such as being based on, derived or generated from, or incorporating) one or more parameters defined for the campaign, and determines whether any parameter should be changed to increase the likelihood of a successful campaign.

In one example implementation, a coordinator of an observation campaign may establish specific requirements or guidelines that are used to determine operational aspects of an observation campaign, where these requirements or guidelines may depend in some respect(s) on a user's or observer's rating. For example, a user rating may be used to determine one or more of (a) which prospective observers to make aware of a specific campaign, (b) which users or observers who request to participate in a campaign should be accepted for participation, or (c) which received real-world data to process or validate based on the rating of the user from which the data was received, etc.

As suggested by FIG. 4, in some embodiments, an observation campaign may be established or defined by a manufacturer, distributor or provider of a product or service at an observation campaign platform (as suggested by step or stage 402). For example, the observation campaign may be established by an observation campaign coordinator (an entity wishing to know about the presentation/display of retail products offered for sale at retail locations) who may select a number of campaign parameters defining an overall observation campaign; that is, the observation campaign may be described or defined by certain parameters or characteristics (for example, those represented by the data structure illustrated in FIG. 3).

As shown in FIG. 4, such parameters or characteristics may include a list or description of the real-world data to be collected (as suggested by element 470, and for example, an image of a product on display and its surroundings), the parameters of that data (471) (such as image size or resolution, time at which image or other data is desired to be collected, etc.), relevant metrics for evaluating the validity or utility of collected data (472), and a measurement threshold value used to decide what amount constitutes a sufficient number (minimum or maximum) of measurements for the campaign (473) or for alteration of a parameter of the campaign.

As suggested, the various metrics (472) defined or described by a campaign coordinator may provide tools for analysis and evaluation of the collected real-world data, where such analysis may result in the modification of one or more campaign parameters or characteristics. As mentioned, the campaign coordinator may establish various measurement thresholds (at step 473) such that an established threshold is to be met before an analysis is triggered that may result in altering a parameter. That is, a specific number of observations (e.g., a threshold of observations) may be needed before any meaningful analysis can be (or should be) conducted that results in the observation campaign parameters being altered.

Once all real-world data settings, parameters, metrics and thresholds are established or defined, the observation campaign may be "launched" (as suggested by step 404), which refers to the process of making participation in the campaign available to users. Launching the observation campaign may include storing all established settings, parameters, metrics and thresholds in a data store at, or otherwise associated with, the observation campaign platform. In some embodiments, the observation campaign parameters and settings may be searchable by an observation campaign application executing on one or more remote mobile computers to enable prospective users/observers to identify observation opportunities of interest to them. In other embodiments, electronic communications may be generated and sent to remote mobile computers that meet a specific set of criteria (e.g., being within a geographic location, being associated with a user/observer having an observer reputation or rating score above a certain threshold, and the like) (as suggested by step 405). In some embodiments, user rating data may be accessed and utilized to identify one or more prospective participants, or to set certain campaign parameters (405).

As observers respond to opportunities presented through the now discoverable or accessible observation campaign, real-world data may be received and collected, where this real world data is collected or acquired by one or more users/observers (406). The data received by the observation platform may then be subjected to one or more "tests", evaluations, or comparisons to determine if it is valid data (408). For example, an assessment may be made to determine if a received digital image is in focus or captures the correct real-world data. As another example, metadata about the real-world data, such as a timestamp, and IP address origination and path may be used to validate the received real-world data. If the data (or a portion of it) is found to be valid, then the valid data is typically assimilated or integrated into a database containing real-world data collected for that particular campaign (410). If the data (or a portion of it) is found to be invalid, then the invalid data may be rejected and not subject to further analysis (412).

The valid collected data may then be tested or evaluated with respect to one or more campaign parameters (420). In one embodiment, a previously defined and stored user rating may be updated based on the results of the data evaluation (430). Next, the process may decide if the valid data requires validation or confirmation by a 3rd party (432). For example, certain situations may require or benefit from 3rd party data validation; these include situations such as (1) monitoring construction progress, which might require data to be validated by a licensed engineer (the engineer would view a photo taken and make sure the proper material was used); (2) reviewing accounting data, which might require domain expertise (e.g., does the summary reconcile to the inputs?); or (3) audio data analysis, which may require use of a specific signal processing program to analyze the sound waves recorded on site (e.g., data is collected by an observer and transferred to the observation platform which then uploads the data to a supercomputer to run the analysis when computational time is least expensive).

If such 3rd party validation is desired or needed (as suggested by the "YES" branch of 432), then a request (such as an email, text message, phone call) may be generated and provided to one or more users/observers who could serve as the 3rd party. In one embodiment, the set of user ratings may be used to select candidates to function as such "qualified" 3rd parties (440). For example, only users/observers having a user rating above some threshold may be selected as potential 3rd party data validators. Once one or more potential 3rd party data evaluators are identified and at least one is engaged to perform the data validation task, then the 3rd party collects their own set of real-world data and provides it to the campaign platform (445).

Note that the database in which the collected (and valid) data is stored is maintained by the observation platform (410), and may include demographic data corresponding to one or more of the user/observer, the point of sale location, the competitive products, etc. In some embodiments, sales and additional demographic data may be collected by users/observers, with the sales data being collected approximately contemporaneously with the product or sales environment related real world data. That is, the sales data is intended to represent the approximate sales or sales trends at the time at which the real-world data is collected.

Based on the analysis of one or more of the real-world data, sales data (if collected), or demographic data (if collected or available), a real-time communication may be generated to communicate the results of the analysis to any number of interested recipients. This communication may be in the form of a change to a display of a mobile device of a user that just collected the real-world data (e.g., the installed application receives an update or notification that is presented to the user via the application or other communication protocol in the phone). The communication may suggest to the user/observer to collect other data, to verify certain information, to request that the proprietor of the location where the data was collected contact the observation campaign coordinator, etc.

As mentioned with regards to the description of FIG. 4, users of the observation platform may have an associated user rating that is established and maintained based on evaluation of the user's activity, data collection competence, and ability to satisfy the requirements of a campaign. For example, the user rating may be affected by the nature of the collected data. Such user evaluation parameters may include the uploaded picture quality, the timeliness of data upload in relation to the establishment of the observation campaign, the frequency of data uploading, the frequency of successful data collection, and the follow-through (i.e., the satisfactory completion) rate on accepted observance opportunities. Thus, as a user participates with the observation platform, a user rating may be maintained at a database at the observation platform server that tracks these activities and generates a subjective user rating for each registered user of the observation platform.

Variables that may impact a user rating include the amount of data collected, the quality of the data, or the timeliness of the data capture. In some embodiments, a machine learning model or neural network may be used to predict the success of a given user/observer, based on the parameters or other aspects of an opportunity. For instance, observer Joe might have shown that he is able to collect high quality pictures, while observer Sally might have shown that she is able to collect high quality video; as a result, the user rating for a video opportunity would be relatively higher for Sally and lower for Joe.

Additional factors may enhance or diminish a user rating that has been established previously. An enhancement or diminishment may be a temporary increase or decrease to a user rating based on factors subject to timing considerations. That is, an established user rating may be enhanced by additional extenuating circumstances. For example, a user rating may be enhanced within a geographic area as a user may be rather successful at fulfilling opportunities within a particular city radius or region. Further, a user rating may be enhanced by having already accepted an opportunity at the same location as an available opportunity. Similarly, a user rating may be diminished by having too many currently accepted opportunities.

With regards to the calculation or computation of a user rating, in some cases the combination of factors that impact a rating may be combined linearly (such as by increasing or decreasing a rating value by a fixed amount). Note that the rating or impact on a rating may be unique for each opportunity/campaign and user; for example, an observer might have a relatively high rating for observations involving food shopping and a relatively low one for outdoor sites. Such a situation would result in high rating for an opportunity that involves a grocery store, a low one for a construction site, and a medium for an outdoor market. Similarly, a user might have a relatively high rating for certain products or types of data collection, and a relatively low rating for certain types of services or types of data being collected.

Figure 5:
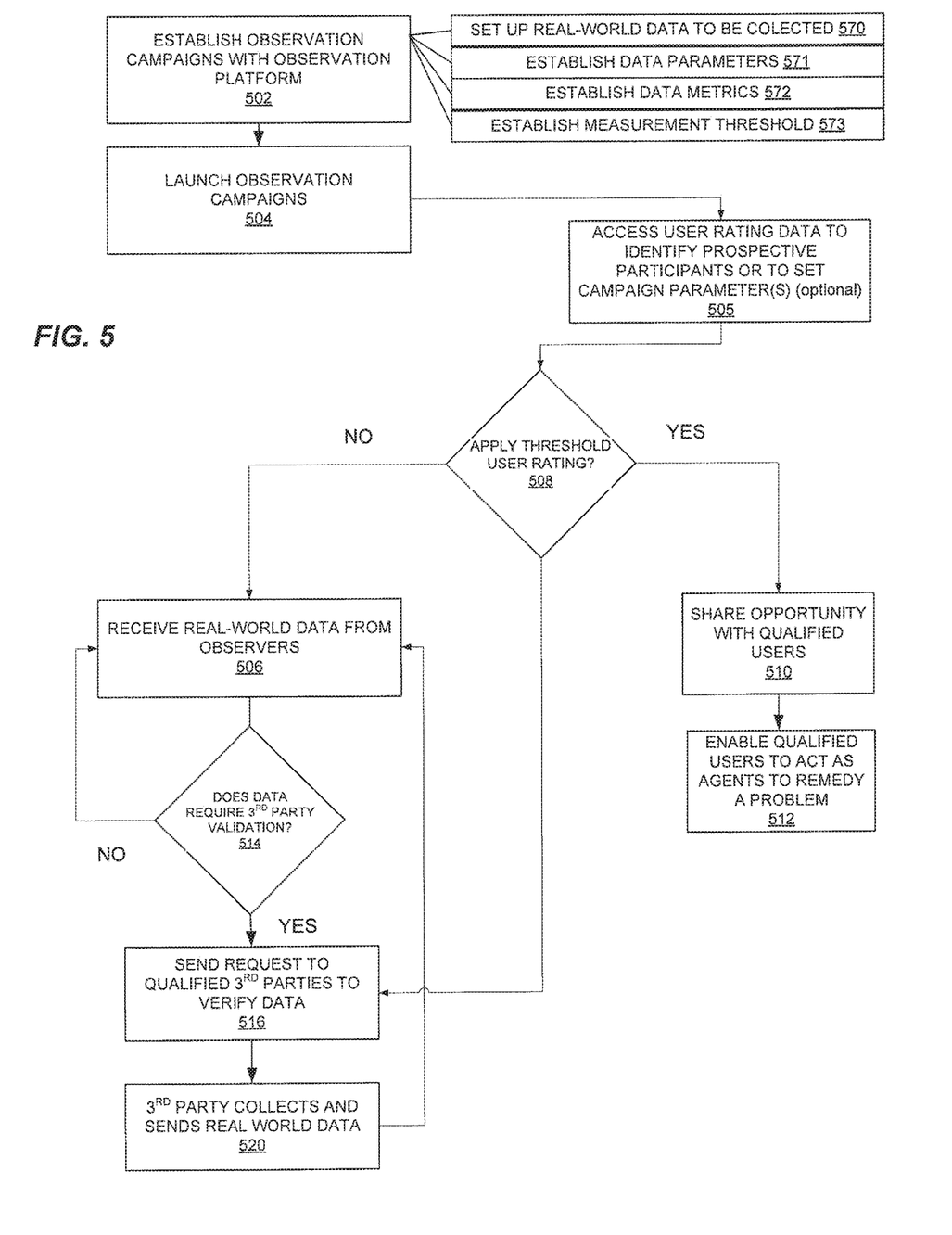
FIG. 5 is a flow chart or flow diagram illustrating a method, process, operation or function for establishing a threshold user rating for use in determining how to make observation opportunities available to potential users/observers or otherwise managing a real-world data observation campaign, according to an embodiment of the subject matter disclosed herein.

An observation campaign may be tailored to utilize the user rating system for making a specific decision regarding one or more of the following aspects of the operation of the described system and process:

Deciding whether to make a specific opportunity or set of opportunity available to a specific user (as suggested by FIG. 5, step 510). This might involve using the user rating as a threshold for deciding which prospective observers to send a notification or invitation to, what opportunities to present to a prospective observer on a webpage, etc. (as in step 508, for example)

For example, a campaign may be established that only allows for users having a rating above a specific user rating threshold to be able to fulfill certain campaign opportunities or to be sent offers to participate in certain opportunities;

A user may be required to go through a training or instructional program or opportunity to establish a base level rating or minimum accepted user rating for certain opportunities or types of opportunities;

In other embodiments, no training or instruction may be required to establish a base level rating, but additional training may improve the base level rating;

A user may agree to be subject to the user rating system or conversely, to only accept opportunities that do not have any user rating requirements or thresholds.

A user's rating may be used to determine whether to accept their request to participate in a specific opportunity that they have been made aware of by receiving a notification or for which they submitted a request to participate after reviewing a list of available opportunities (this may allow for limiting participation in an opportunity to a select set of observers from a group of users applying to participate in an opportunity);

A user's rating may be used to control the processing of received observational data or as another means of deciding on how platform resources are to be allocated—for example, a rating may be used to decide whether to process a set of received data, an order in which to process such data, which server to assign for processing the received data, etc.; or A user's rating may be used to set the compensation for participating in an opportunity, determine how much data validation needs to be done, determine if funds need to be spent advertising for new observers in an area, predicting how quickly a campaign can be completed, etc.

FIG. 5 is a flow chart or flow diagram illustrating a method, process, operation or function for establishing a threshold user rating for use in determining how to make observation opportunities available to potential users/observers or otherwise managing a real-world data observation campaign, according to an embodiment of the subject matter disclosed herein. In order to better facilitate a user rating system, some users' collected data may be verified by a different user or by a third party. Such additional validation may be in the form of user training observations, instructional videos, identity verification (via social media or other online means) token validation for observations, encouraged behaviors for bonus ratings, and the like.

As shown in FIG. 5, an observation campaign is defined by the factors discussed with reference to FIG. 4 (as suggested by steps 570, 571, 572, and 573). Next, an observation campaign is established with the observation platform (502) and eventually launched (504). In some embodiments, user rating data may be accessed and utilized to identify one or more prospective participants, or to set certain campaign parameters (505). A user rating threshold value for a user rating may then be accessed (e.g., from the set of parameters or factors used to define the campaign) and used to determine qualified users/observers or to make another decision with regards to the data processing, etc. (508). If a threshold value for the user ratings is applied (corresponding to the "YES" branch of step or stage 508), then an observation opportunity may be shared with qualified users/observers (510). The qualified users/observers are then enabled to act as agents or observers for the campaign (512).

As noted, in some embodiments, users or prospective users with a user rating that meets a threshold value may be enlisted to act as an agent for the coordinator of the observation campaign (512). In this manner, a user may report seeing a real-world situation in need of remedy, such as labels not facing outwards on products, wrong prices listed, promotional materials displayed, and the like. Enabling the user to act as an agent in such a situation allows the user to actually remedy the real-world situation or engage with a store owner or other third party on behalf of the campaign coordinator in order to seek a remedy to the observed situation. For example, an agent can physically manipulate the situation (move products on the shelves), order more product, call/reach-out to another party to come in and do work, etc.

As a further example, a user with a sufficiently high threshold user rating may be asked to validate the observations of other users having a lower rating. This provides a form of distributed management of the processes being implemented by the system, and may encourage greater participation by qualified users/observers in roles other than direct observer. User ratings can be used by 3rd parties to establish trust for things such as loans or other gig work offers, allow 3rd parties to offer work through the observation platform, or serve as physical proof of a person and their reputation or reliability.

As described with reference to FIG. 4, in some cases it may be desirable to seek assistance from a 3rd party for purposes of validating or verifying certain data (as suggested by step or stage 514). In such cases (as suggested by the "YES" branch of 514), a request may be sent to qualified 3rd parties to assist in data validation or verification, with the selection of those 3rd parties being based on, or influenced by, a user rating value (as suggested by step or stage 516).

In response, some or all of the requested 3rd parties may collect the desired real-world data and provide it to the observation platform for evaluation (as suggested by step or stage 520).

The embodiments described herein focus on the systems, devices, components, and processes used to establish and maintain a rating system for observers. Such a rating system is of value as clients wish to have confidence in the data being collected by various observers. As observers conduct more and more data collections, a user may establish a better and better reputation, and the more reputable or highly rated observers may have additional opportunities for data collection or may be compensated at a higher rate. In some embodiments, one or more of a number of factors may influence an observer's rating or reputation score:
1. a user/observer's rating based on past behavior
    a. picture/image/video quality
    b. timeliness
    c. frequency of observances
    d. home range
    e. acceptance of opportunity rate
    f. frequency of expired accepted opportunities
2. validation of a user or data collected based on third party input
    a. identity verification
    b. Facebook presence
    c. bank account verification
    d. improvement in behavior
    e. training and passing of test
    f. token validation Note that an observation campaign may be tailored to user ratings—for example
  enable users to manipulate real world items after being qualified;
  observers may validate other observers locally through physical verification
  observers may validate other observers non-locally through data verification.

Figure 6:
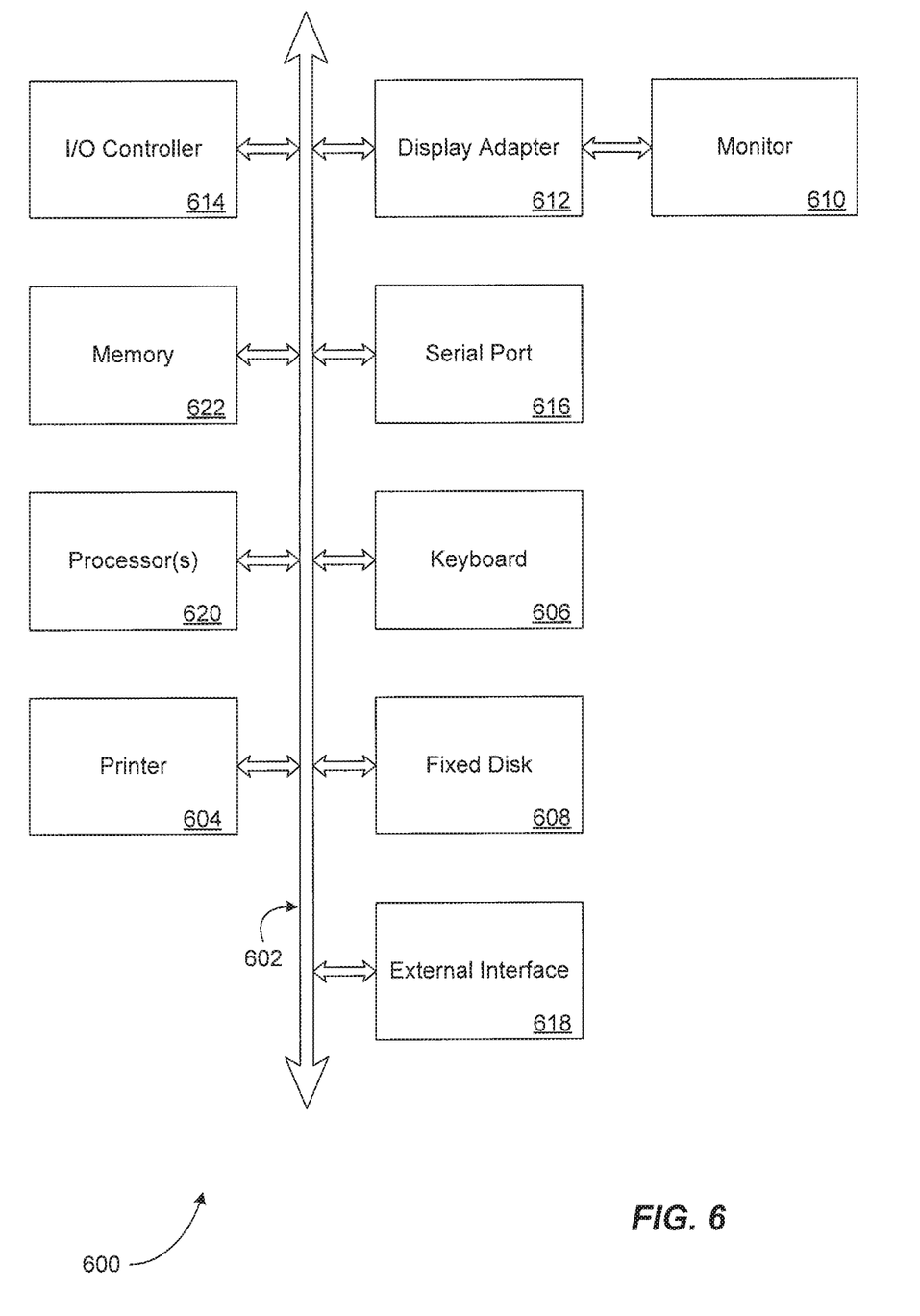
FIG. 6 is a diagram illustrating elements or components that may be present in a computer device or system configured to implement a method, process, function, or operation in accordance with an embodiment of the subject matter disclosed herein.

FIG. 6 is a diagram illustrating elements or components that may be present in a computing device or system configured to implement a method, process, function, or operation in accordance with an embodiment. In accordance with one or more embodiments, the system, apparatus, methods, processes, functions, and/or operations described herein may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, That which is claimed is:

1. A computer-based method embodied in a non-transitory computer-readable medium having computer-executable instructions that when executed by a processor cause:
   accessing information stored in a user database regarding a set of one or more prospective users to record media corresponding to at least one item;
   for each user in the set of prospective users, obtaining information from the user database regarding a user rating corresponding to each user;
   for each user of the set of prospective users, determining at least one user that has a user rating that meets or exceeds a previously determined user rating value or requirement;
   sending an electronic communication to the at least one user;
   receiving a response to the electronic communication from one or more of the users to which the communication was sent, the response including media recorded by the respective user that includes image data corresponding to at least one physical location with respect to a placement on a retail shelf of the at least one item and image data corresponding to an area surrounding the at least one item;
   for each received response, determining whether the received response comprises at least one of receiving the received response within a specified time limit or the received response having an image having at least a threshold size and associated with the response;
   in response, initiating compensation to the user determined to have provided the response; and
   changing the user rating that is stored in the database.

2. The computer-based method of claim 1, further comprising assimilating the data from the received response or responses into a database of similar data.

3. The computer-based method of claim 1 wherein the recorded media includes comments corresponding to the at least one item in the image.

4. The computer-based method of claim 1, wherein a user rating for a specific user is generated based on one or more of a location of the user, a previous experience of the user in being an observer, or a type of the at least one item.

5. The computer-based method of claim 1, wherein the initiating compensation further comprises a third-party service providing financial compensation to the at least one user.

6. The computer-based method of claim 1, wherein accessing information regarding a set of one or more prospective users further comprises one or more of
   accessing information regarding previous users;
   accessing information regarding responses received; or
   accessing information regarding responses received.

7. The computer-based method of claim 1, further comprising changing the user rating that is stored in the database in response to a time limit lapse.

8. The computer-based method of claim 1, further comprising changing the user rating that is stored in the database in response to the user receiving the communication.

9. The computer-based method of claim 1, further comprising changing the user rating that is stored in the database in response to the user receiving the communication and opening an application at a local user computer.

10. The computer-based method of claim 1, further comprising changing the user rating that is stored in the database in response to the user sending a response.

11. The computer-based method of claim 1, further comprising changing the user rating that is stored in the database in response to the user not sending a response.

* * * * *